March 1, 1966   G. SHOLZ ETAL   3,237,394
SHOCK-PROOF PIVOT BEARING FOR FINE MECHANICAL GEARS
Filed July 6, 1964   2 Sheets-Sheet 1
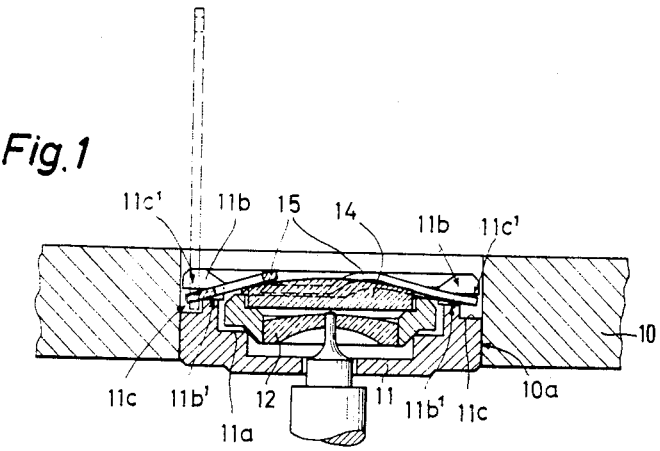
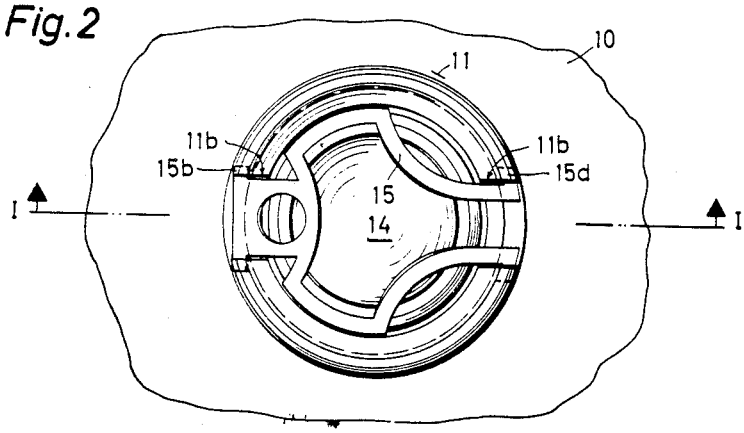
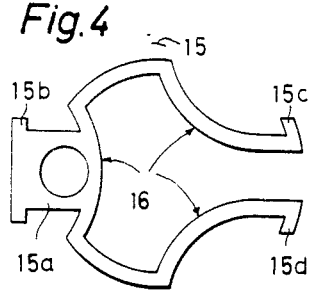
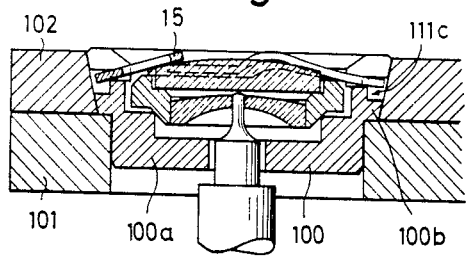
INVENTORS
Günther Scholz
BY Hans Schorn
Watson Cole Grindle & Watson
Attys.

March 1, 1966  G. SHOLZ ETAL  3,237,394
SHOCK-PROOF PIVOT BEARING FOR FINE MECHANICAL GEARS
Filed July 6, 1964  2 Sheets-Sheet 2

INVENTORS
Günther Scholz
Hans Schorn
BY
Watson, Cole, Grindle & Watson
Attys.

United States Patent Office 3,237,394
Patented Mar. 1, 1966

3,237,394
SHOCK-PROOF PIVOT BEARING FOR FINE MECHANICAL GEARS
Gunther Scholz, Schramberg, Wurttemberg, and Hans Schorn, Schiltach, Baden, Germany, assignors to Gebrüder Junghans Aktiengesellschaft, Schramberg, Wurttemberg, Germany, a corporation of Germany
Filed July 6, 1964, Ser. No. 380,485
Claims priority, application Germany, July 15, 1963, J 24,076
1 Claim. (Cl. 58—140)

The invention relates to shock-proof pivot bearings for fine mechanical gears, especially clockwork movements, and concerns construction in which the bearing elements, generally perforated and cap jewels, are held in a ring-shaped bearing element by a substantially U-shaped spring on the base of which hinge pins and on the ends of the free arms of which catch noses each projecting laterally in the plane of the leaf spring are formed. The invention is based on the problem of shaping the bearing element and the shock-absorbing spring in such a manner that particularly the bearing element can be produced in a simple manner on conventional machines, that the assembly of the bearing is likewise simple and finally that a construction of low height is obtained. Therefore, according to one embodiment of the invention in which the bearing element is in the form of a smooth cylinder, a circumferential groove is turned in the outer wall of the bearing element in proximity to its upper edge at about the height of the cap jewel, which groove is intersected by a continuous slit located diametrically in the upper side of the bearing element and having at one end the width of the base and at the other end the width of the arms of the U-shaped shock-absorbing spring which are preferably both the same, whereby the width of the groove is at least equal to the width of the hinge pins.

In a second embodiment of the invention, which is intended primarily for bearing constructions in which the bearing element has a flange-like seating edge at the top, the continuous slit also extending diametrically in the upper side of the bearing element, intersects with its base surface steps cut from below tangentially to the seating edge.

Both embodiments possess the advantage that the means for the hinge-like mounting and for the resilient engagement of the shock-absorbing spring in operative position can be produced by simple turning and milling work and with a single setting on automatic lathes equipped with screw nicking device.

Further features and advantages of the invention will become apparent from the following description of two embodiments of the invention, from the drawings and the claims. The drawings show on an enlarged scale in:

FIG. 1 a shock-proof bearing of the first embodiment in side section taken on line 1—1 of FIG. 2;

FIG. 2 is a top plan view of FIG. 1;

FIG. 3 is a side section similar to FIG. 1, wherein the wall of the bearing element is stepped;

Figure 5:
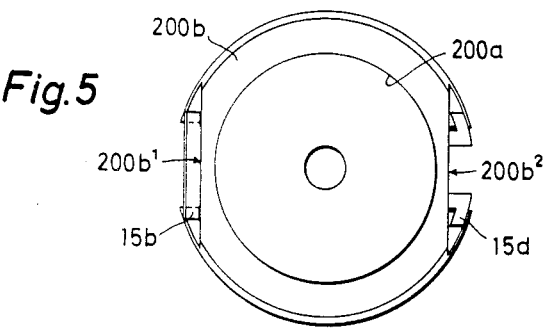
Figure 6:
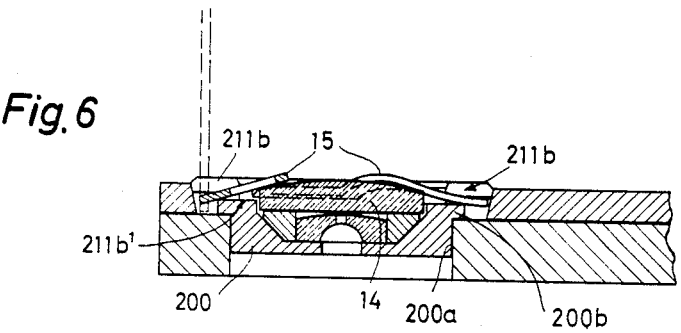
Figure 7:
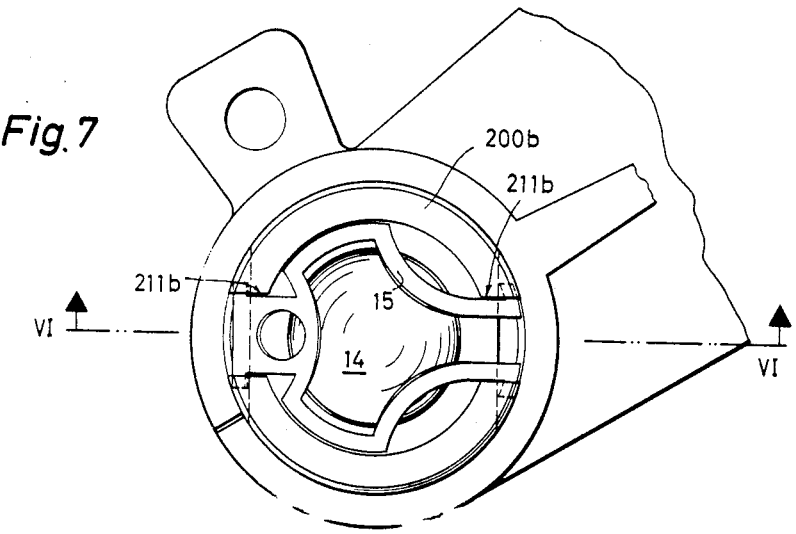

FIG. 4 the shock-absorbing spring for the bearing construction illustrated in the preceding and following figures, viewed separately from above;

FIG. 5 a bottom view of the second form of construction of the bearing according to the invention;

FIG. 6 lateral sectional views belonging to FIG. 2, taken on line VI—VI of FIG. 7, and FIG. 7 a top plan view of FIG. 6.

In the first embodiment of the invention (FIGS. 1 and 2) 10 designates a plate and 10a a smooth cylindrical bore into which the bearing element 11 is pressed according to the desired clearance in height. The bearing element 11 accommodates the perforated jewel 12 with mounting 13 and the cap jewel 14 in a stepped recess 11a. The construction and function of these elements is known per se and does not require to be described at greater length. The shock-absorbing spring is designated as a whole by 15; it has a U-shaped basic shape, 15a being the base on which lateral projections, which are hereinafter referred to as the hinge-pins 15b are cut; 15c are the U-arms of the spring on the free ends of which outwardly projecting noses 15d are cut which serve for the resilient engagement with the undercuts in the bearing element to be described later. The portion of the spring 15 extending between the base 15a and the arms 15c is so shaped that a three-point contact against the cap jewel 14 is produced which is indicated by three arrows 16 in FIG. 4. This detail is itself also known and also that the shock-absorbing spring 15 can be folded up into vertical position (FIG. 1) for the purpose of cleaning the bearing, oiling etc.

In order to produce the mounting and locking means for the shock-absorbing spring 15 on the bearing element 11, a continuous slit 11b is cut diametrically of uniform width throughout in the upper side of the bearing element, the width of this slit being equal to the width of the base 15a and the width of the arms 15c of the shock-absorbing spring 15. The depth of this slit is such that its base surface 11b′ intersects a groove 11c worked in the side of the wall of the bearing element 11. The upper boundary surface 11c′ of this groove 11c is located in relation to the jewel cap 14 so that the shock-absorbing spring, bearing at one end with the hinge pins 15 and at the other end with the locking noses 15d against this boundary surface 11c′, presses with its middle portion under the desired pretension against the jewel cap 14 and the bearing elements 13, 12 located thereunder. The groove 11c is of sufficient width to allow the hinge pins 15b to turn, that is the shock-absorbing spring can be folded up into the open position (FIG. 1).

Whereas a bearing construction is illustrated in FIGS. 1 and 2 in which the bearing element 11 is smooth cylindrical, FIG. 3 shows the upper bearing for a balance staff. Here the bearing element 100 has an offset step 100a with the aid of which it is pressed in the bore 101a of the plate 101, whereas the peripheral groove 111c for receiving the hingle and locking elements 15b and 15d of the shock-absorbing spring 15 is worked into a step 100b widening conically upwards; it serves for guiding the spiral pointer 102.

While in the examples illustrated in FIGS. 1, 2 and 3 the hinge and locking elements of the shock-absorbing spring 15 are received in a continuous groove worked in the bearing element from the side, a device produced by a simple milling process serves the same purpose in the construction illustrated in FIGS. 5 to 7. The bearing element 200, which in this case, as in the case of the construction shown in FIG. 3, is intended for mounting a balance staff and has an off-set step 200a and a flange-like seating edge 200b, is again provided with a diametrical slot 211b on its upper side. Instead of the groove 111c turned in the outer wall surface of the step 100b widening conically upwards in the form of construction illustrated in FIG. 3, two tangentially extending steps 200b′ and 200b² are milled from below in the seating edge 200b of the bearing element 200 in the present construction, these steps being of such depth that the bottom surface 211b′ of the slot 211b intersects these tangential steps and also of such depth that the shock-absorbing spring in its operative position (FIG. 6) has the desired pretension for resiliently holding the cap jewel 14 and the bearing elements located thereunder.

The peripheral groove 11c of the embodiment illustrated in FIGS. 1 and 2 or the milled steps 200b' and 200b² of the embodiment illustrated in FIGS. 5 to 7 can be used both in the case of smooth cylindrical bearing elements as well as those with seating edges.

What we claim is:

In a shock-proof pivot bearing for fine mechanical gears, particularly clockwork movements having bearing elements, a substantially U-shaped blade spring comprising a base in the form of hinge pins, free arms having locking noses projecting laterally in the plane of the blade spring, an outer wall of the bearing element having a continuous groove therein turned in proximity to the upper edge at about the height of a cap jewel, said groove being intersected by slots provided diametrically in the upper side of the bearing element and having at one end the base projecting therein and at the other end, the arms of the U-shaped spring projecting thereinto, the width of the groove being at least equal to the width of the hinge pins and the locking noses.

References Cited by the Examiner

UNITED STATES PATENTS 2,233,743  3/1941  Marti _____ 58—140

FOREIGN PATENTS 1,186,621  2/1959  France.
255,756  1/1949  Switzerland.

LEO SMILOW, *Primary Examiner.*

GERALD F. BAKER, *Assistant Examiner.*